United States Patent [19]

Ishikawa et al.

[11] Patent Number: 5,249,060
[45] Date of Patent: Sep. 28, 1993

[54] USING HORIZONTAL AND VERTICAL SYNCHRONIZATION SIGNALS TO EXCLUDE INHIBITING PRINTING IN AN AREA DEFINED BY NECESSARY DESCRIPTION AREA DATA

[75] Inventors: Satoshi Ishikawa; Akira Sasaki, both of Hitachi, Japan

[73] Assignee: Hitachi, Ltd., Tokyo, Japan

[21] Appl. No.: 796,388

[22] Filed: Nov. 22, 1991

[30] Foreign Application Priority Data

Nov. 22, 1990 [JP] Japan ................................ 2-318444

[51] Int. Cl.⁵ ..................... H04N 1/23; H04N 1/38; B41J 2/47
[52] U.S. Cl. .................................. 358/296; 358/453; 346/108; 395/117
[58] Field of Search ............... 358/296, 452, 453, 300, 358/302, 409; 355/218; 346/108, 160; 395/117

[56] References Cited

U.S. PATENT DOCUMENTS

| | | | |
|---|---|---|---|
| 4,837,635 | 6/1989 | Santos | 358/453 |
| 4,985,778 | 1/1991 | Ayata | 358/296 |
| 5,049,932 | 9/1991 | Sumida | 355/218 |

FOREIGN PATENT DOCUMENTS 296660 12/1987 Japan.

*Primary Examiner*—Edward L. Coles, Sr.
*Assistant Examiner*—Scott A. Rogers
*Attorney, Agent, or Firm*—Antonelli, Terry Stout & Kraus

[57] ABSTRACT

In a description area means of an image printing apparatus such as a laser printer, a request signal for setting a description area is output from the laser printer to a host apparatus and a signal for setting the description area is received by the laser printer and a necessary description area is set voluntarily. The description area is a right blank, a left blank, an upper blank and a lower blank etc. The necessary description area is set according to the description area setting signal. The necessary description area can be set voluntarily from the host apparatus, and it is unnecessary to transmit the image information as to the area excluding the setting necessary image area. During the printing operation the printing is inhibited at the description area excluding the setting description area. A protection function about an inferior description at the blank area (non-description area) in the laser printer can be obtained.

6 Claims, 5 Drawing Sheets

USING HORIZONTAL AND VERTICAL SYNCHRONIZATION SIGNALS TO EXCLUDE INHIBITING PRINTING IN AN AREA DEFINED BY NECESSARY DESCRIPTION AREA DATA

BACKGROUND OF THE INVENTION

The present invention relates to an image printing apparatus such as a laser beam printer and, more particularly to an image printing apparatus wherein an image description area is controlled in the image printing apparatus. The present invention relates to a laser beam printer as a page printer and, more particularly to a laser beam printer wherein an image description area is controlled in the laser beam printer.

A conventional image printing apparatus will be explained by referring to a laser beam printer. A conventional laser beam printer construction includes generally a video signal reception means which receives a video signal from a host means. Such a video signal defines an "on-off" control of a laser diode for every picture element individually.

A laser beam is scanned in accordance with this received video signal on a surface of a photosensitive material member such as a printing paper through various means such as a laser drive means, $F\ominus$ lens and a polygon mirror rotated by a polygon motor.

A two-dimensional image is formed on the surface of the photosensitive material member by rotating the photosensitive material member, for example the surface of the printing paper as the recording medium. Such an electrostatic latent image is output using a xerography process.

In the above stated conventional laser beam printer construction, an optical sensor is arranged on a laser beam scanning line (a, main scanning direction) and detects a write-out start point of a description area in the laser beam printer.

Under the standard of this laser beam detection signal of the optical sensor generated from the video signal reception means, a horizontal synchronizing signal which synchronizes with the laser beam detection signal from the optical sensor is transmitted to the host means.

In this conventional laser beam printer construction, under the standard of such a transmitted horizontal synchronizing signal, the host means transmits a video signal having N scanning parts to the video signal reception means.

Further, in a printing paper transportation direction (an auxiliary scanning direction), similarly to the above horizontal synchronizing signal, a vertical synchronizing signal which synchronizes with the laser beam detection signal is transmitted to the host means.

Under the standard of this vertical synchronizing signal, the host means transmits a picture element having M scanning parts to the video signal reception means as a video signal. The printing having one page part is finished in accordance with a modulation of the laser diode within the description area which is constructed by the picture elements having a sum of $N \times M$ parts.

Therefore, according to the conventional laser beam printer construction, there are various problems with the host means receiving picture element data having $N \times M$ parts of what kind of patterns; further in the description area of the laser beam printer, the laser beam is constructed to control even a blank portion existing in the printing paper in accordance to white data from the host means by the laser beam drive means.

According to the above stated conventional laser beam printer, when the host means is a word processor, for example, and an operator can variable and frequently set a format including a blank portion in the word processor, it is necessary to transmit all of the picture elements having $N \times M$ parts into the laser beam printer as the video signal.

Further, the blank portions in the photosensitive material member (the printing paper) in the laser beam printer, which exists respectively at the left portion and the right portion and the upper portion and the lower portion, are treated as a part of the description data and are tested without a protection means, accordingly the high quality of the laser beam printer cannot be assured due to the malfunction in the laser diode and laser drive means, for example. and the malfunction causes improper description data.

SUMMARY OF THE INVENTION

An object of the present invention is to provide an image printing apparatus wherein a description area in a recording medium can be set voluntary.

Another object of the present invention is to provide an image printing apparatus wherein with respect to a description area excluding a setting description area in a recording medium image information from a host means can be made unnecessary.

A further object of the present invention is to provide an image printing apparatus wherein during a printing operation time periods printing can be inhibited from a description area excluding a setting description area into a recording medium.

A further object of the present invention is to provide an image printing apparatus wherein protection for printing can be attained at a necessary description area in a recording medium.

A further object of the present invention is to provide an image printing apparatus wherein each of description area times can be recognized in a host means.

According to the present invention, an image printing apparatus comprises a host means for transmitting description data, a communication means for receiving the description data transmitted from the host means, printing means for printing in accordance with an image information received by the communication means and storage means for setting a description area data received by the communication means and from the host means, and the image printing apparatus further comprises inhibition means, in accordance with the description area data stored in the storage means during a printing practice period; the inhibition means inhibits the printing into the printing means at an area excluding the setting necessary description area.

With the above stated image printing apparatus construction according to the present invention, the description area data received from the host means can be stored and during the printing practice period the printing for the area excluding the setting necessary description area can be inhibited.

Accordingly, the necessary description area can be set voluntarily from the host means and it is unnecessary to transmit the image information from the host means as to the area excluding the setting necessary image area.

Further, according to the present invention, a laser beam printer comprises laser beam drive means for driving a laser beam in accordance with an image signal received from host means, beam deflection means for scanning horizontally the laser beam on a recording medium, recording medium transportation means for moving the recording medium toward vertical direction, a storage means for setting description area data received from the host means, main scanning direction management control means for inhibiting a drive of the laser beam in accordance with an image signal in the laser beam drive means in response to a scanning position of the laser beam in the beam deflection means and the setting necessary description area data set in the storage means, and auxiliary scanning direction control management means for inhibiting a drive of the laser beam in accordance with the image signal in the laser beam drive means in response to a moving position of the recording medium in the recording medium transportation means and the setting necessary description area data set in the storage means.

With the above stated laser beam printer construction according to the present invention, the setting necessary description area data received from the host means is set in the storage means; in response to the scanning position of the laser beam in the beam deflection means and the setting necessary description area data set in the storage means, the drive of the laser beam in accordance with the image signal in the laser beam drive means can be inhibited, and further in response to the moving position of the recording medium in the recording medium transportation means and the setting necessary description area data set in the storage means, the drive of the laser beam in accordance with the image signal in the laser beam drive means can be inhibited.

Accordingly, the necessary description area can be set voluntarily from the host means; it is unnecessary to transmit the image information from the host means as to the area excluding the setting necessary image area and further the protection for the printing can be practised at any area.

Further, with the above stated laser beam printer construction according to the present invention, and with respect to the horizontal direction of the scanning position of the laser beam from the beam deflection means, the horizontal synchronizing signal shows the significant when the setting necessary description data set in the storage means exists within a designated are, and, with respect to the vertical direction of the scanning position of the laser beam from the beam deflection means, the vertical synchronizing signal shows significant value when the setting necessary description data set in the storage means exists within the designated area.

Since both the horizontal synchronizing signal and the vertical synchronizing signal are transmitted to the host means, the video signal can be used as the image signal, and, further, the host means can recognize each of the area periods.

Further, according to the present invention, a laser beam printer comprises laser beam drive means for driving a laser beam in accordance with an image signal received from host means, a beam deflection means for scanning horizontally the laser beam on a recording medium, recording medium, transportation means for moving the recording medium in a vertical direction, storage means for setting a necessary description area data received from the host means, first transmission means for transmitting a horizontal synchronizing signal, the horizontal synchronizing signal showing a significant value when the setting necessary description data set in the storage means exists within a designated area as to a horizontal direction of a scanning position of the laser beam from the beam deflection means, second transmission means for transmitting a vertical synchronizing signal, the vertical synchronizing signal showing a significant when the setting necessary description data set in the storage means exists within a designated area as to a vertical direction of a scanning position of the laser beam from the beam deflection means and laser beam drive means for driving the laser beam in accordance with a video signal received from the host means during a period in which both the horizontal synchronizing signal and the vertical synchronizing signal show the significant value.

With the above stated laser beam printer construction according to the present invention, the setting necessary description area data received from the host means is set in the storage means, and, further, as to the horizontal direction of the scanning position of the laser beam from the beam deflection means, the horizontal synchronizing signal shows the significant value when the setting necessary description data set in the storage means exists within a designated area, and, as to the vertical direction of the scanning position of the laser beam from the beam deflection means, the vertical synchronizing signal shows the significant value when the setting necessary description data set in the storage means exists within the designated area.

Since both the horizontal synchronizing signal and the vertical synchronizing signal are transmitted to the host means, the laser beam drive means can drive the laser beam according to the video signal received from the host means only during the period in which both the horizontal synchronizing signal and the vertical synchronizing signal shows the significant value, respectively.

Accordingly, the necessary description area can be set voluntarily from the host means, it could be unnecessary to transmit the image information from the host means for the area excluding the setting necessary image area; the protection for the printing can be practised at any area, and further the host means can recognize each of the area periods.

As stated above, the image printing apparatus such as the laser beam printer according to the present invention can provide the following effects. Namely, the necessary description area in the image printing apparatus can set voluntarily and, also, in the image printing apparatus, it can be unnecessary to produce from the host means the image information for the area excluding the setting necessary image area.

DESCRIPTION OF THE INVENTION

One embodiment of an image printing apparatus according to the present invention will be explained referring to FIG. 6. A laser beam printer as a page printer is exemplified as the image printing apparatus according to the present invention.

Figure 6:
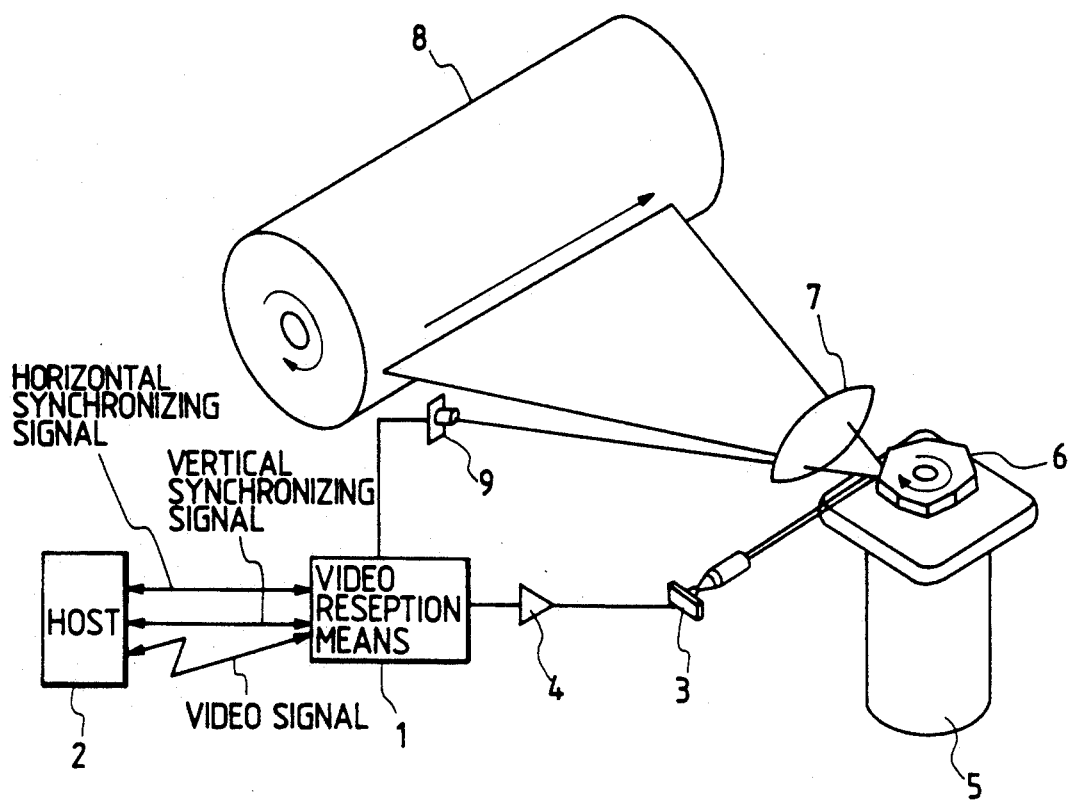
FIG. 6 shows one embodiment of an image printing apparatus according to the present invention.

A basic construction of the laser beam printer is shown in FIG. 6. The laser beam printer comprises mainly video signal reception means 1, host means 2 for transmitting a video signal to the video signal reception means 1, a laser diode 3 for producing a light emitting beam, laser drive means 4 for driving the laser diode 3, a polygon mirror drive motor 5, a polygon mirror 6 rotated by the polygon mirror drive motor 5, F⊖ lens 7 for reforming the light emitting beam from the laser diode 3, a photosensitive material member 8 and an optical sensor 9 for detecting a standard in various management areas.

The video signal reception means 1 receives the video signal from the host means 2. Such a video signal defines an "on-off" control of the laser diode 3 for every picture element individually. The laser beam from the polygon mirror 6 is scanned on the photosensitive material member 8 in accordance with the video signal from the reception means 1, the laser drive means 4 and the F⊕ lens 7. two-dimensional image is formed on the surface of the photosensitive material member 8 in accordance with the rotation of the photosensitive material member 8. The electrostatic latent image formed on the photosensitive material member 8 is output according to the xerography process.

The laser beam printer includes the optical sensor 9. The optical sensor 9 is means for detecting a standard in various control management areas. The optical sensor 9 is arranged on an extension line of a laser scanning line from the polygon mirror 6 through F⊖ lens 7. The optical sensor 9 outputs BDTH signal as a horizontal direction standard signal and BDTV signal as a vertical direction standard signal.

The laser beam printer transmits respectively a horizontal synchronizing signal and a vertical synchronizing signal to the host means 2. The host means 2 makes the transmitted vertical synchronizing signal a standard and transmits a picture element data as the video signal to the video signal reception means 1.

Figure 1:
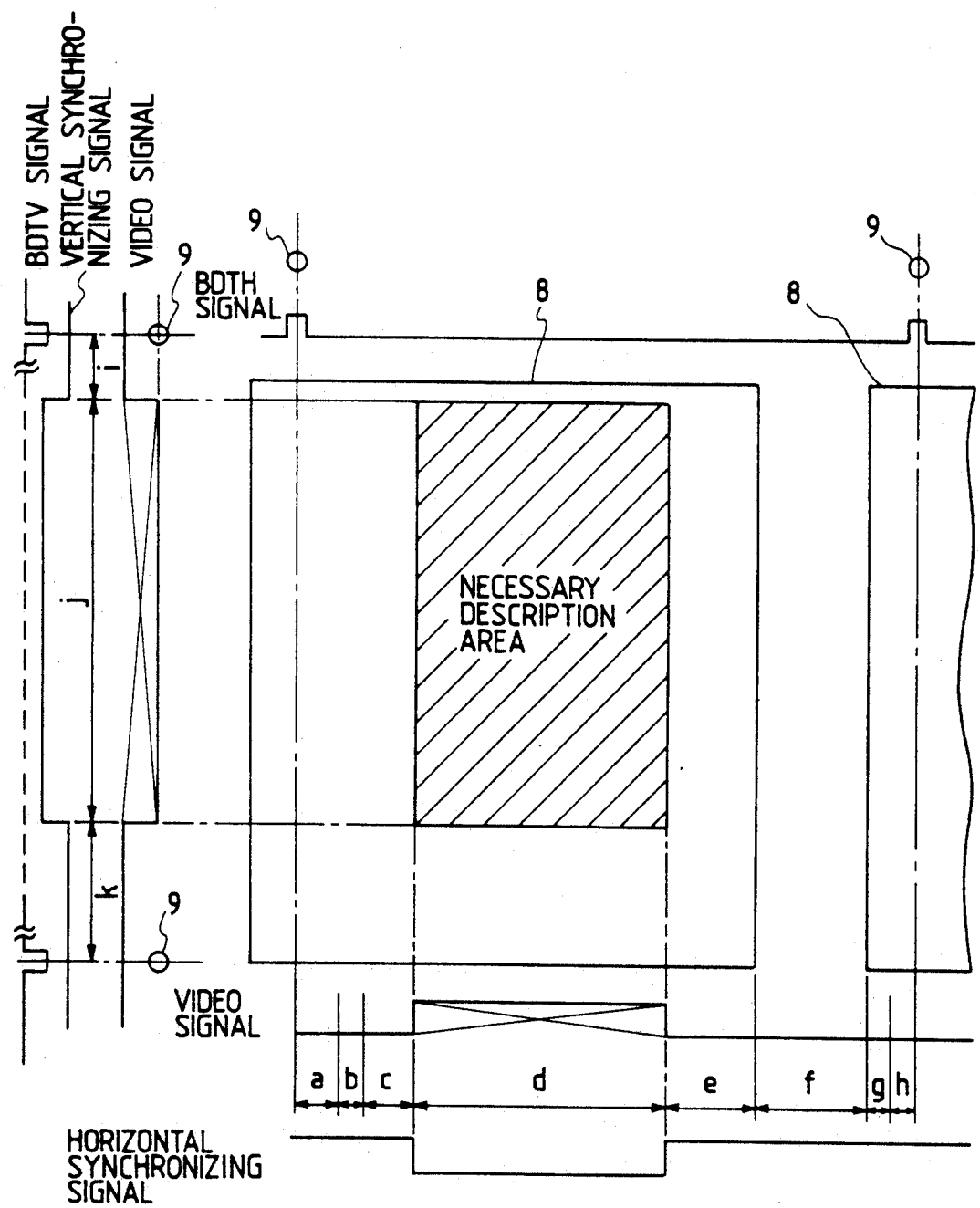
FIG. 1 shows a control management area used in a laser beam printer according to the present invention.

Next, one example of a division process of the control management area used in this laser beam printer according to the present invention will be explained by referring to FIG. 1.

The photosensitive material member 8 as the recording medium comprises a printing paper, for example. In FIG. 1, the printing paper is exemplified as the photosensitive material member 8. In FIG. 1, the vertical direction correspond to a laser beam scanning, direction, and the horizontal direction corresponds to a printing paper feeding direction of the printing paper 8, respectively.

A main scanning control management area is divided respectively eight areas in this embodiment. Namely, the main scanning control management area is comprised of an area a, an area b, an area c, an area d, an area e, an area f, an area g and an area h toward in the laser beam scanning direction. A photo-pulse obtained by the optical sensor 9, in other words BDTH signal, is used as a start point.

Each of the area a and the area b is an area for preventing the unnecessary toners from adhering to the printing paper 8 by a laser beam by compulsory lighting-off of control the laser diode 3.

The area c is an area for compulsorily lighting-off compulsorily area of laser diode 3. This area c is arranged from the left end of the printing paper 8 in accordance with the necessary description area setting data of the host means 2.

The area d is an area for permitting an "on-off" control of the laser diode 3 in accordance with the video signal from the video signal reception means (a video signal generating means) 1. The video signal reception means 1 generates the video signal according to the picture element information from the host means 2.

The area e is a laser beam compulsory lights-off area. This area e is arranged at an end of the printing paper 8 after the necessary description area.

The area f is a laser beam compulsory lights-on area for adjusting and correcting an output of the laser diode 3.

The area g is a laser beam compulsory lights-off area to a detection area for BDTH signal. The area h is BDTH signal detection area for irradiating the laser beam to the optical sensor 9.

Besides, an auxiliary scanning control management area is divided respectively into three areas in the printing paper feeding direction. This auxiliary scanning control management area is comprised of an area i, an area j and an area k under BDTV signal as a standard.

The area i is a laser beam compulsory lights-off area of the laser diode 3 from a tip end of the printing paper 8 in accordance with a designation from the host means 2.

The area j is a necessary description area in the auxiliary scanning direction. The area k is a laser beam compulsory lights-off area in accordance with a designation from the host 2 means similar to that of the area i.

Further, the horizontal synchronizing signal and the vertical synchronizing signal transmit respectively a timing for outputting the video signal to the host means 2.

The method for transmitting the horizontal synchronizing signal and the vertical synchronizing signal can employ a method of transmitting by using H (high) level signal and L (low) level signal and a method, of transmitting by using a pulse signal, for example.

In this embodiment of the present invention, it will be explained by the method of transmitting by using H level signal and L level signal.

Next, the construction about the necessary description area setting means for setting the necessary description area will be explained by referring to the drawings. The necessary description area setting means sets the necessary description area in accordance with the designation from the host means 2.

Figure 2:
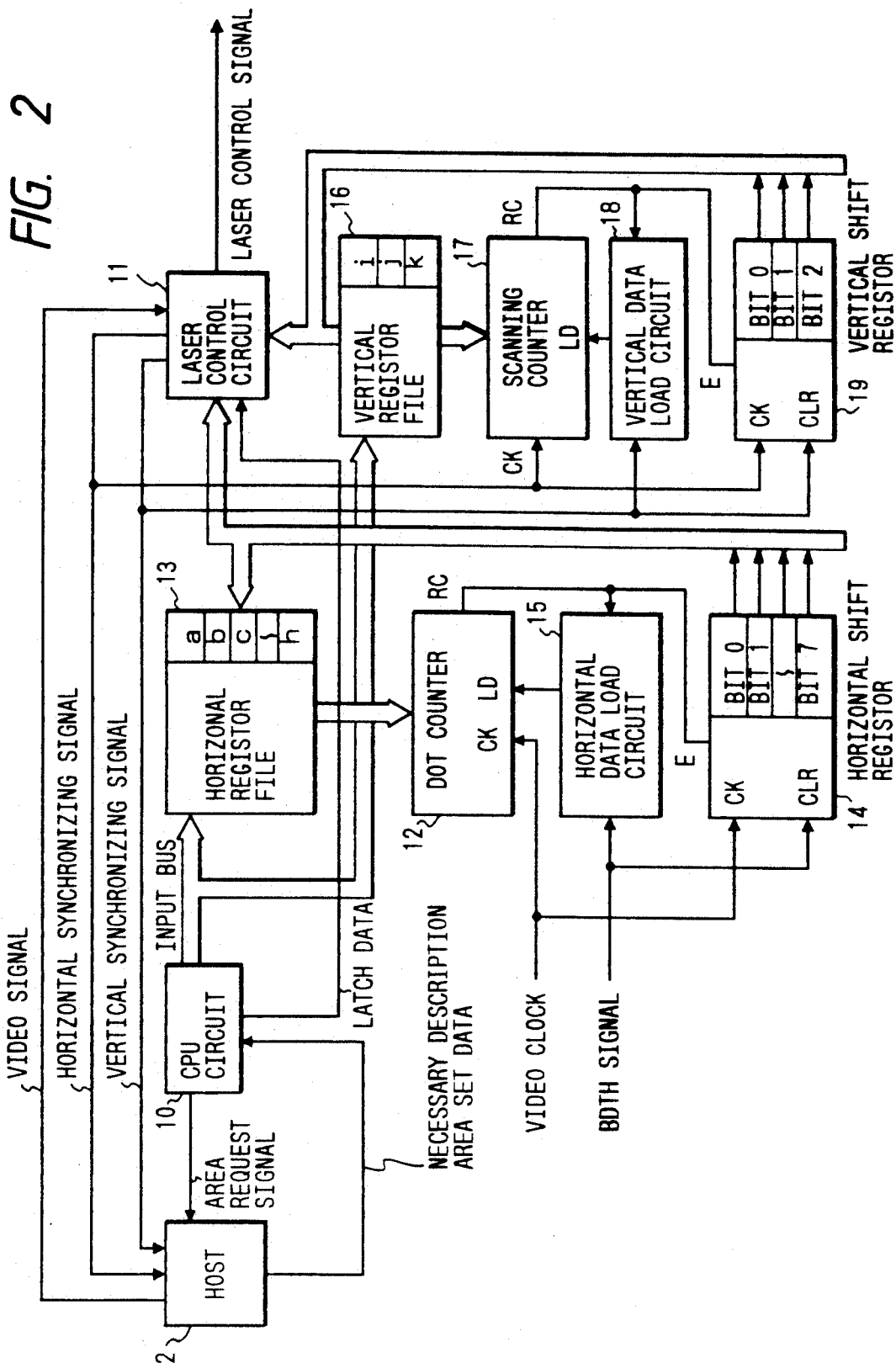
FIG. 2 shows the construction for the necessary description area setting means according to the present invention.

FIG. 2 shows the construction for the necessary description area setting means according to the present invention. This necessary description area setting means is provided in the video signal reception means 1 shown in FIG. 1.

The necessary description area setting means comprises CPU circuit 10, a laser control circuit 11, a horizontal dot counter 12 for incremently the video signal with the printing bar every picture element individually, a horizontal register file 13 for storing the size of each of the main scanning control management area, a horizontal shift register 14, a horizontal data load circuit 15, a vertical register file 16 for storing the size of each of the auxiliary scanning control management area, a scanning counter 17 for incrementing BDTH signal with the printing for every scanning line individually, a vertical data load circuit 18 and a vertical shift register 19.

Figure 3:
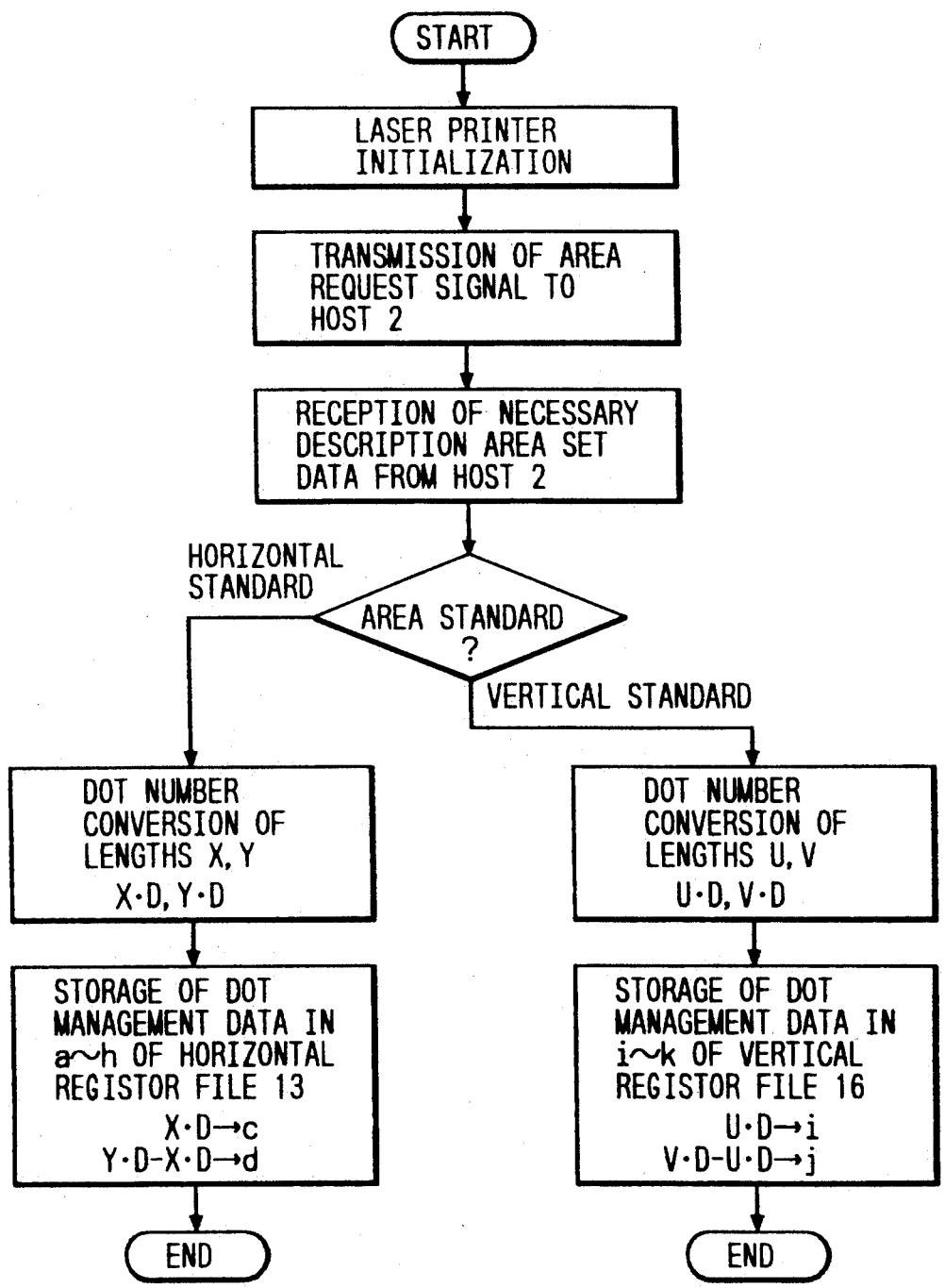
FIG. 3 is a flow chart illustrating the processing methods for the motion of the necessary description area.

The motion of the necessary description area setting means having the above stated construction will be explained. First of all, the setting motion of each control management will be explained referring to FIG. 3 in which the processing methods for CPU circuit 10 are shown.

When the laser beam printer is initialized, CPU circuit 10 transmits the area request signal to the host means 2. Besides, host means 2 outputs the various information is to CPU circuit 10 as the necessary description area setting data.

Such various informations are the length X between the left end of the printing paper 8 and the area c for defining the non-description area, the length Y between the left end of the printing paper 8 and the right end of the area d for defining the description area, the length U between the upper end of the printing paper 8 and the lower end of the area i for defining the description area and the length V between the upper end of the printing paper 8 and the lower end of the area j for defining the description area.

CPU circuit 10 converts each of the length X, the length Y, the length U and the length V which are designated by the host means 2 to the respective dot number X·D, Y·D, U·D and V·D, respectively. The area d controls each of the dot numbers of (Y·D − X·D). The area j controls each of the dot numbers of (V·D − U·D).

CPU circuit 10 stores the dot numbers corresponding to the areas comprising from the area a to the area h in the horizontal register file 13 Further, CPU circuit 10 stores the dot numbers corresponding to the area comprising from the area i to the area k in the vertical register file 16.

Next, the description motion in the necessary description area setting means will be explained. First of all, the description motion with respect to the horizontal direction in the necessary description area setting means will be explained.

The horizontal data load circuit 15 initializes the horizontal shift register 14 for designating the areas comprising from the area a to the area h in accordance with the BDTH signal for determining the write position standard in the laser scanning direction. At the same time, the horizontal data load circuit 15 loads the dot number of the area a in the horizontal dot counter 12.

The horizontal dot counter 12 counts up by the video signal clock corresponding to one picture element. When the horizontal dot counter 12 exceeds the loaded dot number, the horizontal dot counter 12 outputs a RC signal to the horizontal data load circuit 15 and the horizontal shift register 14. The horizontal shift register 14 becomes enabled by RC the signal from the horizontal dot counter 12. Further, the horizontal shift register 14 is shifted with by one bit in synchronization with the video signal clock and renews the main scanning control management area. After the main scanning control management area is renewed to bit 7, the horizontal shift register or 14 returns to bit 0.

Further, when the horizontal data load circuit 15 receives the RC signal, the horizontal data, load circuit 15 loads the dot number of the area b into the horizontal dot counter 12.

With respect to other areas, the above stated description motion in the horizontal direction proceeded similarly in the necessary description area setting means.

Next, the description motion with respect to the vertical direction in the necessary description area setting means proceeds similarly to the above stated description motion of the horizontal direction.

Namely, the vertical data load circuit 18 initializes the vertical shift register 19 in accordance with the BDTV signal. At the same time, the vertical data load circuit 18 loads the dot number of the area i in the scanning counter 17.

The scanning counter 17 counts up by the horizontal synchronizing signal corresponding to one scanning (one raster). When the scanning counter 17 goes over the loaded dot number, the scanning counter 17 outputs the RC signal to the vertical shaft register 19.

The vertical shift register 19 becomes enabled by the RC signal from the scanning counter 17. Further, the vertical shift register 19 is shifter by one bit in synchronization with the horizontal synchronizing signal and renews the auxiliary scanning control management area. After the auxiliary scanning control management area is renewed to bit 2, the vertical shift register 19 returns to bit 0.

With respects other areas, the above stated description motion in the vertical direction is proceeds similarly in the necessary description area setting means.

Figure 4:
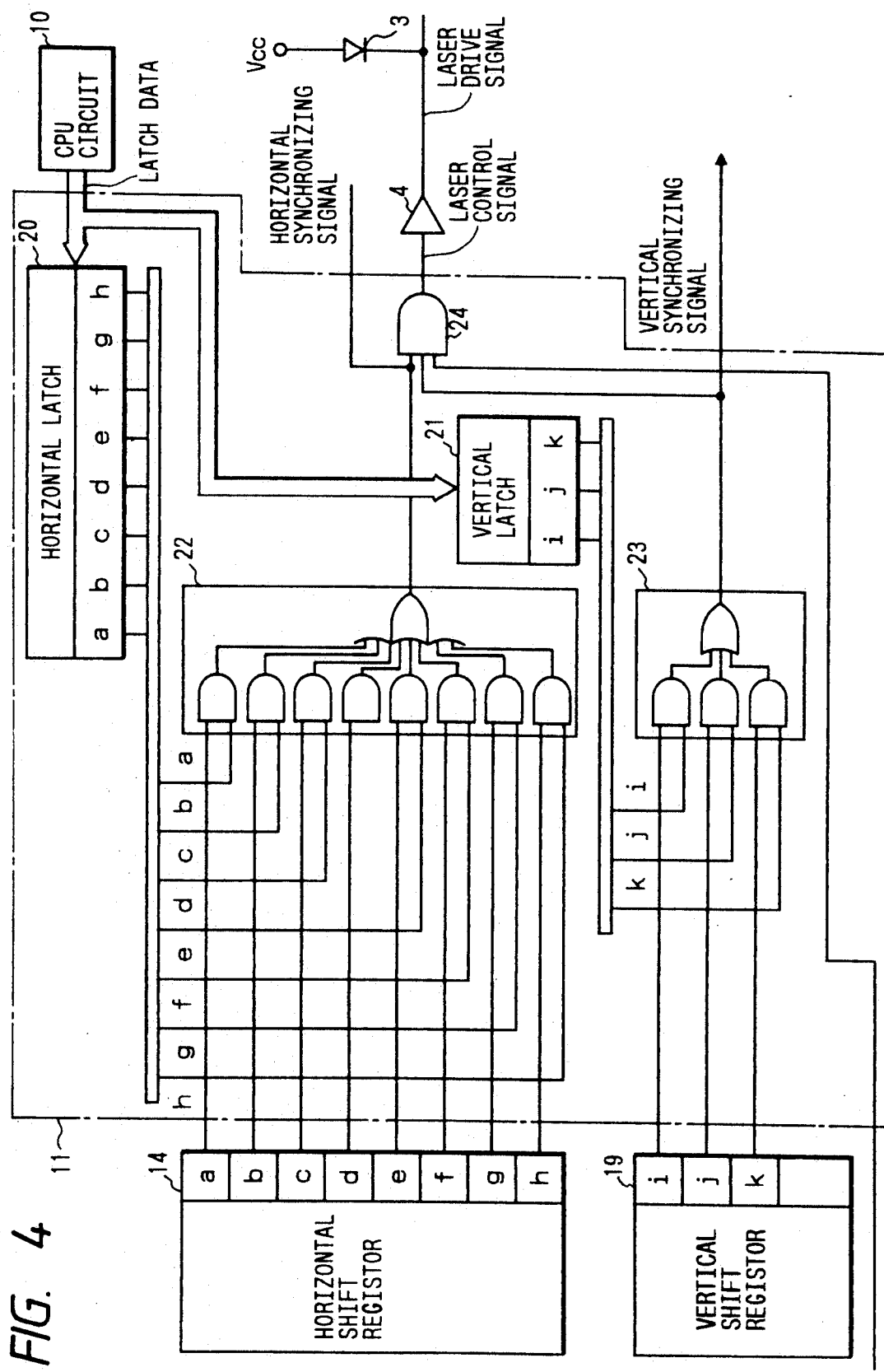
FIG. 4 shows the construction of the laser control circuit in the laser beam printer according to the present invention.

Next, the construction of the laser control circuit 11 in the laser beam printer according to the present invention will be explained by referring to FIG. 4.

The laser control circuit 11 comprises a horizontal latch 20 for setting the bit in the main scanning control management area described by CPU circuit 10, a vertical latch 21 for setting the bit in the auxiliary scanning control management area described by CPU circuit 10, a horizontal selector 22 for producing the logical sum, the vertical selector 23 for producing the logical sum and an AND circuit 24.

In a case that the description area is fixed as the area d in the horizontal direction and the area j in the vertical direction, it is not necessary to provide these latches. However, according to the provision of these latches, it is possible to make any control management area as the description area. Further, the bits in the area d in the horizontal direction and the area i in the vertical direction can be set.

Next, the motion of the laser control circuit 11 in the laser beam printer will be explained as follows.

In the horizontal selector 22, the logical sum is produced by a bit data and signal. Such a bit data shows each area of the horizontal shift register 14 and is renewed by setting the scanning to proceed in the horizontal direction of the laser beam. Such a signal is transmitted from the horizontal latch 20 and is defined to permit the "on" or "off" control of the laser diode 3 in each area. Thereby, the horizontal synchronizing signal is generated from the horizontal selector 22.

Besides, in the vertical selector 23, the logical sum is produced by a bit signal and a signal. Such a bit signal shows each area of the vertical shift register 19 and is renewed by setting the scanning to proceed in the vertical direction of the laser beam.

Such a signal is transmitted from the vertical latch 21 and is defined to permit the "on" or "off" control of the laser diode 3 in each area. Thereby, the vertical synchronizing signal is generated from the vertical selector 23.

Figure 5:
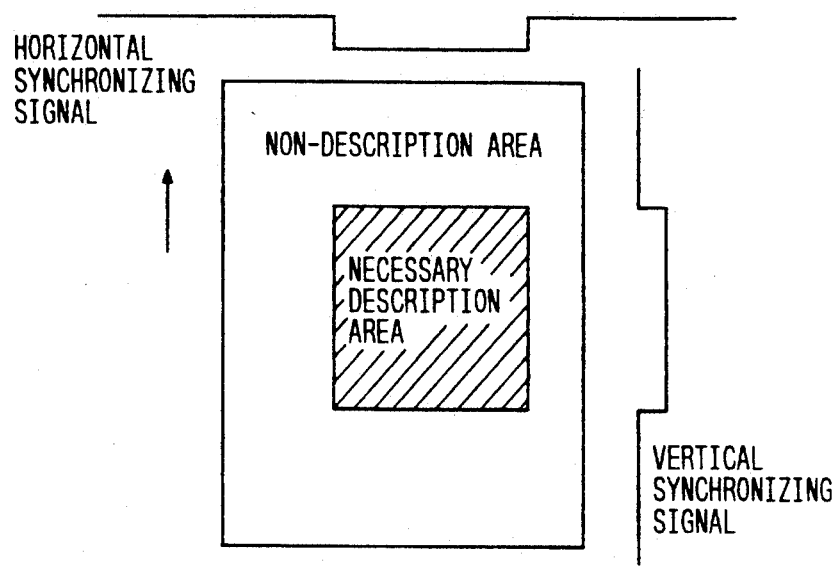
FIG. 5 shows the necessary description area and its operation in relation to the horizontal synchronizing signal and the vertical synchronizing signal.

In AND circuit 24, the logical sum is produced by the horizontal synchronizing signal from the horizontal selector 22 and the vertical synchronizing signal from the vertical selector 23 and the video signal from the host means 2. Accordingly, the laser beam printer is driven only the setting necessary description area. As a result, it is possible to describe to only the desired area (the necessary description area) as shown in FIG. 5.

As stated above, according to this embodiment of the present invention, since the necessary description area of the laser beam printer can be variably set, it is possible to drive the laser diode at only the necessary description area variably the host means needs. Accordingly, a error by the lights-on of the laser diode in the unnecessary area cannot happen, and further the high reliability in the laser beam printer can be attained.

Further, in this embodiment of the present invention, it is constructed as that the image data is received from the host means by setting the horizontal synchronizing signal and the vertical synchronizing signal. However, the image memory may provide in the laser beam printer, and it can be constructed as that the picture element having the description area part and stored ready beforehand is set in accordance with the horizontal synchronizing signal and the vertical synchronizing signal and thereby the picture element can be read out.

In the above embodiment of the present invention, the laser beam printer is exemplified as one of the image printing apparatus, however the present invention can realize also in other general image printing apparatuses.

We claim:

1. An image printing apparatus comprising:
host means for transmitting image information including description data having description area data;
communication means for receiving said image information including said description data having said description area data transmitted from said host means;
printing means for printing in accordance with said image information received by said communication means; and
storage means for storing said description area data received by said communication means from said host means; wherein the image printing apparatus further comprises:
inhibition means for inhibiting in accordance with said description area data stored in said storage means, during a printing practice period, the printing by said printing means at an area excluding a necessary description area corresponding to said stored description area data;
a first transmission means for transmitting a horizontal synchronizing signal, said horizontal synchronizing signal including a first significant value when said description area data in said storage means exists within a first designated area, and a second transmission means for transmitting a vertical synchronizing signal, said vertical synchronizing signal including a second significant value when said description area data in said storage means exists within a second designated area.

2. An laser beam printer comprising:
host means for transmitting an image signal and necessary description area data;
laser beam drive means for driving a laser beam in accordance with the image signal received from said host means;
beam deflection means for scanning horizontally the laser beam on a recording medium in accordance with a scanning position;
recording medium transportation means for moving said recording medium in a vertical direction;
storage means for storing the necessary description area data received from said host means;
main scanning direction management control means for inhibiting the driving of the laser beam in accordance with said image signal by said laser beam drive means in response to the scanning position of the laser beam being scanned from said beam deflection means and said necessary description area data in said storage means; and
auxiliary scanning direction management control means for inhibiting the driving of the laser beam in accordance with said image signal by said laser beam drive means in response to a moving position of said recording medium being moved by said recording medium transportation means and said necessary description area data in said storage means;
wherein said laser beam drive means drives the laser beam in accordance with a video signal as said image signal is received from said host means, and wherein said laser beam printer further comprises;
first transmission means for transmitting a horizontal synchronizing signal, the horizontal synchronizing signal having a first significant value when said necessary description area data in said storage means exists within a first designated area corresponding to a horizontal direction of said scanning position of the laser beam being scanned from said beam deflection means, and
second transmission means for transmitting a vertical synchronizing signal, said vertical synchronizing signal including a second significant value when said necessary description area data in said store means exists within a second designated area corresponding to a vertical direction of said scanning position of the laser beam being scanned from said beam deflection means.

3. A laser beam printer comprising:
host means for transmitting an image signal and including description data having necessary description area data;
laser beam drive means for driving a laser beam in accordance with the image signal received from said host means;
beam deflection means for scanning horizontally the laser beam on a recording medium in accordance with a scanning position;
recording medium transportation means for moving said recording medium in a vertical direction;
storage means for storing the necessary description data and said necessary description area data received from said host means;
first transmission means for transmitting a horizontal synchronizing signal, the horizontal synchronizing signal having a significant value when said necessary description area data stored in said storage means exists within a first designated area corresponding to a horizontal direction of said scanning position of the laser beam being scanned from said beam deflection means;

second transmission means for transmitting a vertical synchronizing signal, said vertical synchronizing signal having a significant value when said necessary description area data in said store means exists within a second designated area corresponding to a vertical direction of said scanning position of the laser beam being scanned from said beam deflection means; and said laser beam drive means driving the laser beam in accordance with a video signal received as said image signal from said host means during a period of time when both said horizontal synchronizing signal and said vertical synchronizing signal are respectively at said significant value.

4. A laser beam printer according to claim 3, wherein a logical sum is produced in accordance with said generated horizontal synchronizing signal and said generated vertical synchronizing signal and said video signal from said host means, thereby the laser beam printer is driven only in said necessary description area.

5. A laser beam printer comprising:

host means for transmitting image signals and a necessary description area data;

laser beam drive means for driving a laser beam in accordance with the image signal received from said host means;

beam deflection means for scanning horizontally said laser beam on a surface of a photosensitive material member in accordance with a scanning position;

photosensitive material member transportation means for moving said photosensitive material member in a vertical direction;

storage means for storing said necessary description area data received from said host means:

first transmission means for transmitting a horizontal synchronizing signal, the horizontal synchronizing signal having a significant value when said necessary description area data in said storage means exists within a first designated area corresponding to a horizontal direction with respect to said scanning position of the laser beam being scanned from said beam deflection means;

second transmission means for transmitting a vertical synchronizing signal, said vertical synchronizing signal having a significant value when said necessary description area data in said store means exists within a second designated area corresponding to a vertical direction with respect to said scanning position of the laser beam scanned from said beam deflection means;

said laser beam drive means driving the laser beam in accordance with a video signal received as said image signal from said host means during a period of time when both said horizontal synchronizing signal and said vertical synchronizing signal are respectively at said significant value; and means for outputting a latent image formed on a surface of said photosensitive material member in accordance with a rotation of said photosensitive material member.

6. A laser beam printer according to claim 5, wherein a logical sum is produced in accordance with said generated horizontal synchronizing signal and said generated vertical synchronizing signal and said video signal from said host means, thereby the laser beam printer is driven only during said setting necessary description area.

* * * * *